US012613193B2

(12) United States Patent
Hiramura et al.

(10) Patent No.: US 12,613,193 B2
(45) Date of Patent: Apr. 28, 2026

(54) MEASUREMENT SYSTEM AND MEASUREMENT METHOD

(71) Applicant: ARKRAY, Inc., Kyoto (JP)

(72) Inventors: Fumito Hiramura, Kyoto (JP);
Alexander Turner, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 173 days.

(21) Appl. No.: 18/479,273

(22) Filed: Oct. 2, 2023

(65) Prior Publication Data

US 2024/0133820 A1 Apr. 25, 2024
US 2024/0230548 A9 Jul. 11, 2024

(30) Foreign Application Priority Data

Oct. 20, 2022 (JP) ................................. 2022-168628

(51) Int. Cl.
*G01N 21/84* (2006.01)
*G06K 7/10* (2006.01)
*H04N 23/74* (2023.01)

(52) U.S. Cl.
CPC ..... *G01N 21/8483* (2013.01); *G06K 7/10861* (2013.01); *H04N 23/74* (2023.01);
(Continued)

(58) Field of Classification Search
CPC ....... G01N 21/8483; G01N 2201/0221; G01N 2201/0692
See application file for complete search history.

(56) References Cited

U.S. PATENT DOCUMENTS

2013/0203043 A1* 8/2013 Ozcan .................. G01N 21/645
435/7.1
2015/0092253 A1 4/2015 Kasahara et al.
(Continued)

FOREIGN PATENT DOCUMENTS

JP 2015-070572 A 4/2015
WO 2020/003021 A1 1/2020

OTHER PUBLICATIONS

Yafei Hou et al., "Smartphone-Based Dual-Modality Imaging System for Quantitative Detection of Color or Fluorescent Lateral Flow Immunochromatographic Strips", Nanoscale Research Letters, vol. 12, No. 1, Apr. 21, 2017, pp. 1-13, Springer, US, doi: 10.1186/s11671-017-2078-9.
(Continued)

*Primary Examiner* — Hina F Ayub
(74) *Attorney, Agent, or Firm* — Studebaker Brackett PLLC

(57) ABSTRACT

A measurement system including: an insertion gate into which a test strip including first and second regions is inserted; a holder accommodating the test strip; a housing including a window facing the test strip; and a smart device including an illuminator illuminating the second region and including a camera imaging the first and second regions, in which the housing includes a mounting part placing the smart device on an outer surface of the housing in a state in which the camera and the illuminator are disposed at positions facing the window, and a measurement light source provided at a position to irradiate the first region, and in a case in which the camera images the first region, the illuminator is turned off while the measurement light source is turned on, and in a case in which the camera images the second region, the illuminator is turned on.

6 Claims, 16 Drawing Sheets

(52) U.S. Cl.
CPC ................ *G01N 2201/0221* (2013.01); *G01N 2201/0692* (2013.01)

(56) References Cited

U.S. PATENT DOCUMENTS

| | | | |
|---|---|---|---|
| 2020/0001299 A1* | 1/2020 | Fleming ................ | B01L 3/5023 |
| 2022/0065795 A1 | 3/2022 | Pal et al. | |
| 2023/0243820 A1* | 8/2023 | Karunen ............ | G01N 21/8483 |
| | | | 436/164 |

OTHER PUBLICATIONS

The extended European search report issued by the European Patent Office on Mar. 18, 2024, which corresponds to European Patent Application No. 23201193.2-1020 and is related to U.S. Appl. No. 18/479,273.

Communication pursuant to Article 94(3) EPC issued by the European Patent Office on Jun. 20, 2025, which corresponds to European Patent Application No. 23201193.2-1001 and is related to U.S. Appl. No. 18/479,273.

* cited by examiner

MEASUREMENT SYSTEM AND MEASUREMENT METHOD

CROSS-REFERENCE TO RELATED APPLICATION

This application claims priority under 35 USC 119 from Japanese Patent Application No. 2022-168628, filed on Oct. 20, 2022, the disclosure of which is incorporated by reference herein.

BACKGROUND

Technical Field

The present invention relates to a measurement system and a measurement method for optically detecting a measurement object in a sample by spreading the measurement object with a test strip.

Related Art

As a measurement system for optically detecting a measurement object in a specimen by spreading the measurement object with a test strip, for example, techniques as shown in WO 2020/003021 A1 and JP 2015-070572 A are disclosed. In the technique described in WO 2020/003021 A1, a test strip is illuminated with a multicolor LED, and the color intensity of the test strip is analyzed from an image obtained by simultaneously capturing the test strip and a calibration pad with a camera. In the technique described in JP 2015-070572 A, an image reading device that blocks ambient light is provided with a light source controller for controlling plural light sources in order to control plural lighting patterns.

The technique described in WO 2020/003021 A1 aims to capture plural images with different combinations of light sources of multicolor LEDs and obtain an optimum image from among them. Furthermore, the technique described in JP 2015-070572 A aims to obtain high-quality image data by including plural light sources, capturing different images according to the light sources, and then combining the different images. That is, in the techniques described in these prior art documents, different images by plural light sources are exclusively used for imaging one imaging region of a test strip.

SUMMARY

An embodiment of the present disclosure provides a measurement system and a measurement method capable of, in a case in which there are plural imaging regions in a test strip, performing appropriate imaging according to the imaging regions.

An aspect of the present disclosure is a measurement system including: an insertion gate into which a test strip including a first region and a second region is to be inserted; a holder that accommodates the test strip inserted via the insertion gate; a housing including a window facing the test strip accommodated in the holder; and a smart device including an illuminator that illuminates the second region of the test strip accommodated in the holder and including a camera that images the first region and the second region. Moreover, the housing includes a mounting part that places the smart device on an outer surface of the housing, in a state in which the camera and the illuminator are disposed at positions facing the window, and a measurement light source provided at a position to irradiate the first region of the test strip accommodated in the holder. Furthermore, in a case in which the camera images the first region, the illuminator is turned off while the measurement light source is turned on, and in a case in which the camera images the second region, the illuminator is turned on.

According to an embodiment of the present disclosure, there is provided a measurement system and a measurement method capable of, in a case in which there are plural imaging regions in a test strip, performing appropriate imaging according to the imaging regions.

BRIEF DESCRIPTION OF THE DRAWINGS

Exemplary embodiments will be described in detail based on the following figures, wherein.

DETAILED DESCRIPTION

Figure 1:
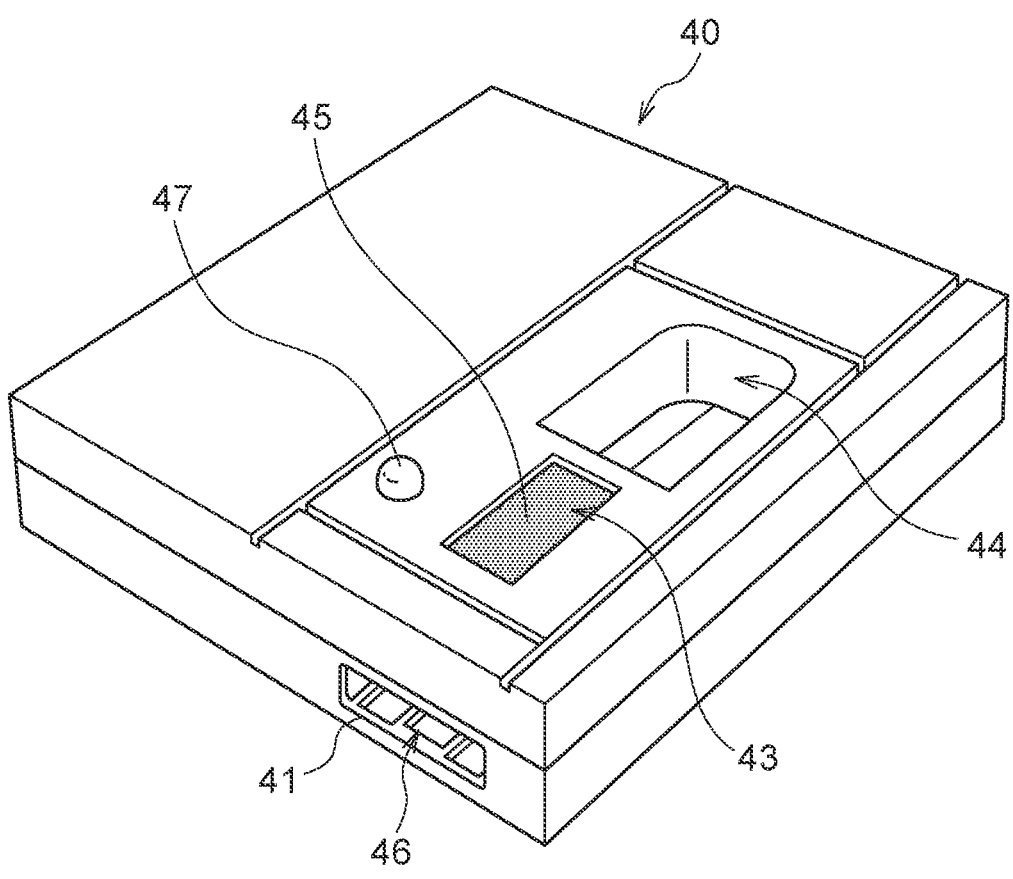
FIG. 1 is an upper perspective view illustrating a holding unit used in an embodiment.

Hereinafter, embodiments of the present disclosure will be described with reference to the drawings. The same reference signs in the drawings indicate the same portions without any particular description. Furthermore, each member and each portion illustrated in each drawing are merely schematically drawn, and the size and positional relationship of the actual product are not necessarily accurately expressed.

(1) Holding Unit

FIG. 1 is an upper perspective view illustrating a holding unit 40 used in a measurement system 10 (see FIG. 11) of the present embodiment. In the measurement system 10 of the present disclosure, the holding unit 40 as illustrated in FIG. 1 may be included as a member constituting a housing 20 (see FIG. 8). The holding unit 40 has a box shape, and two openings of a measurement opening 43 and an identification opening 44 are formed on an upper surface. An optical filter 45 is fitted into the measurement opening 43. The upper surface is further provided with a sensor 47 that senses light. An insertion gate 41 into which a test strip 60 (see FIG. 3) described later is inserted is opened in a side surface of the holding unit 40. An internal space of the insertion gate 41 is a holder 46 that is a space in which a part of the test strip 60 is accommodated, communicating with the measurement opening 43 and the identification opening 44.

Figure 2:
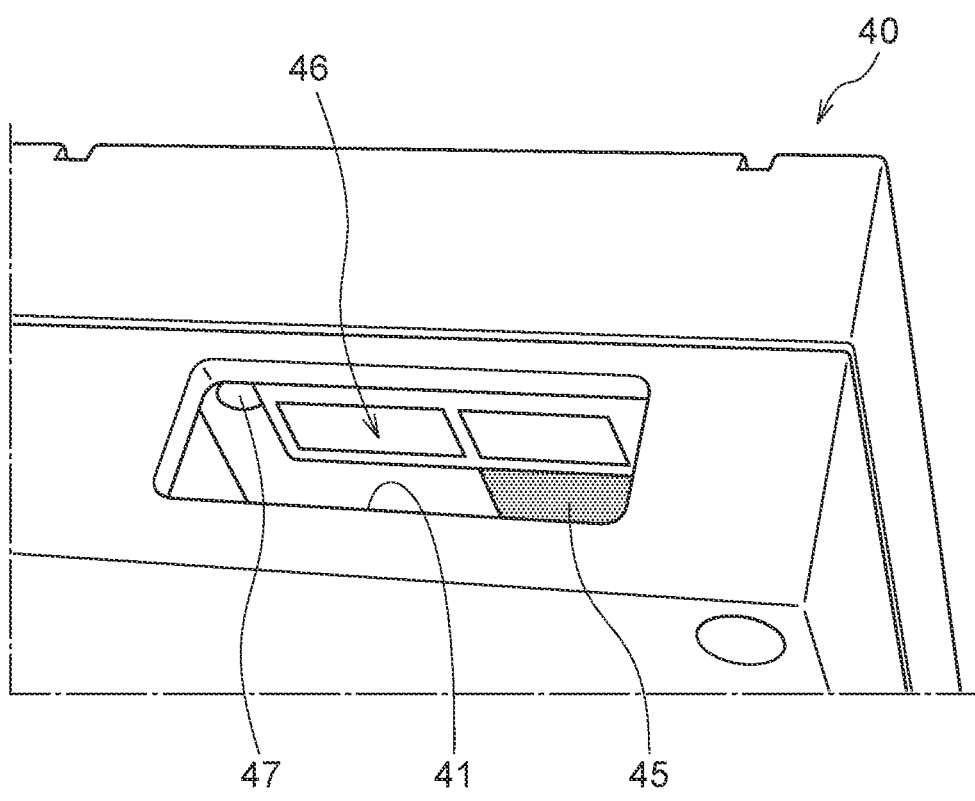
FIG. 2 is an enlarged lower perspective view of the vicinity of an insertion gate of the holding unit.

FIG. 2 is an enlarged lower perspective view of the vicinity of the insertion gate 41 of the holding unit 40. The sensor 47 is provided in the vicinity of the measurement opening 43 in the holder 46 that is the internal space of the insertion gate 41. A measurement light source 42 (see FIG. 13) provided inside the holder 46 emits light including a light beam having a wavelength suitable for imaging a first region 61. Then, the optical filter 45 has an optical characteristic of suitably transmitting only a light beam having a wavelength suitable for the imaging.

(2) Test Strip

Figure 3:
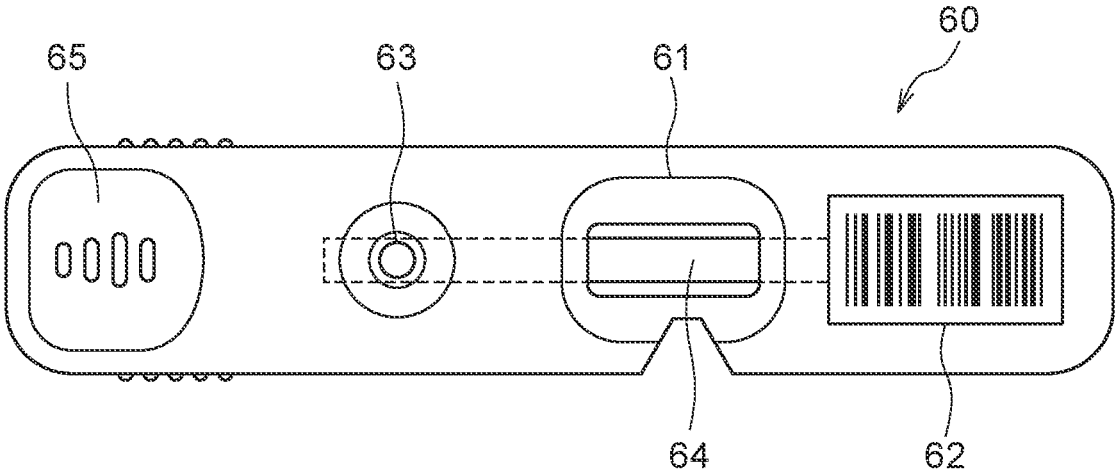
FIG. 3 is a plan view of a test strip used in the embodiment.

FIG. 3 illustrates the test strip 60 used in the measurement system 10 (see FIG. 11) of the present embodiment in plan view. The test strip 60 has a flat rod-like outer shape. A grip portion 65 whose upper surface side is recessed is formed at one end of the test strip 60, and the test strip 60 can be gripped with fingers by holding the grip portion 65. A test paper 64 having an elongated shape along a longitudinal direction of the test strip 60 is accommodated in the test strip 60. The test paper 64 is exposed upward at two openings formed on an upper surface of the test strip 60. Among these two openings, a portion closer to the grip portion 65 is a sample spotting portion 63, and a portion farther from the grip portion 65 is the first region 61 that is a measurement region where the measurement of a measurement object is performed. Moreover, a second region 62 as an identification region in which information regarding the test strip 60 is recorded is formed on the other end side of the test strip 60, that is, on the upper surface of a place farthest from the grip portion 65. Hereinafter, with respect to the test strip 60, a side close to the grip portion 65 is referred to as an "upstream side", and a side close to the second region 62 is referred to as a "downstream side".

The test paper 64 is obtained by applying a water absorbing layer to a surface of a water absorbent such as filter paper or a synthetic resin substrate. The test paper 64 contains a reagent that reacts with a measurement object to develop color. A sample assumed to contain a measurement object is spotted to the sample spotting portion 63. Examples of the sample include a liquid specimen collected from a living body, for example, blood or urine, or a diluent obtained by diluting these with an appropriate solvent, or a solid or mucus collected from a living body, or a liquid specimen obtained by diluting or suspending these in an appropriate solvent. Examples of the measurement object include a component contained in the liquid specimen, or an antigen derived from an exogenous microorganism or virus.

Figure 4:
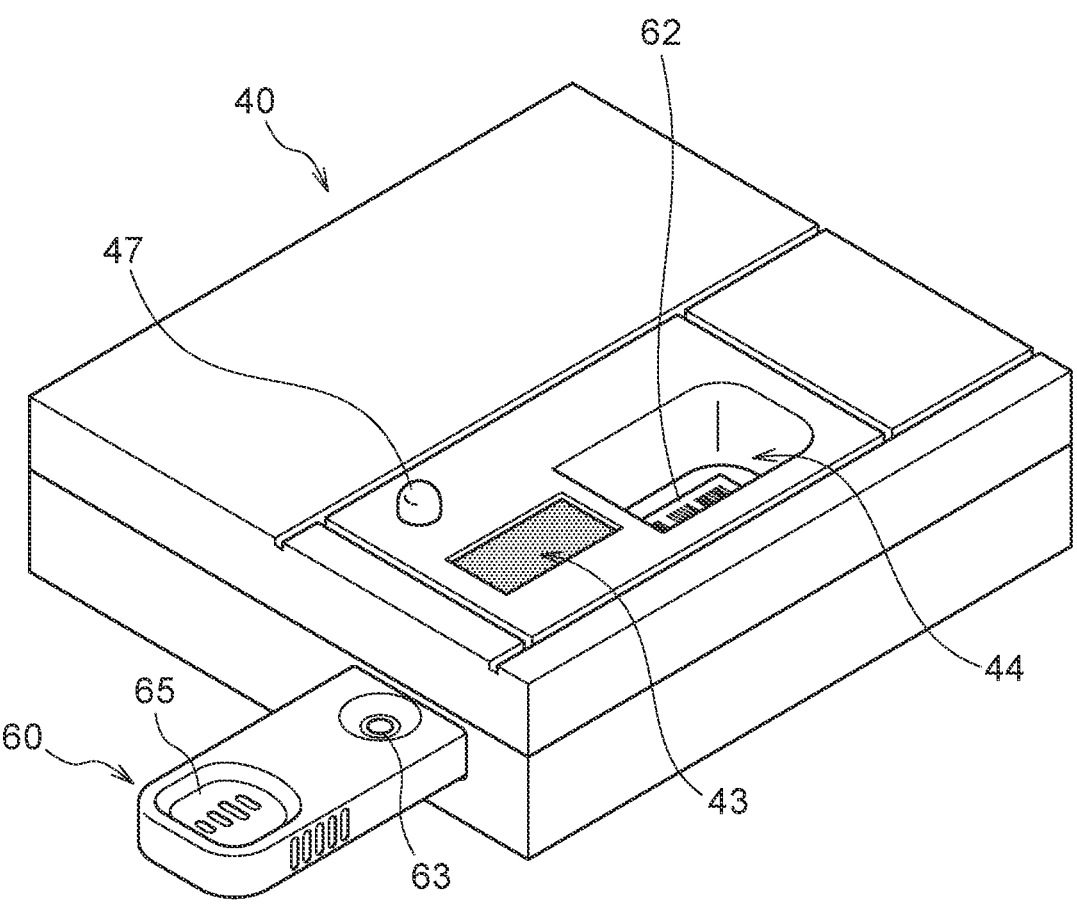
FIG. 4 is an upper perspective view illustrating a state in which the test strip is attached to the holding unit.
Figure 5:
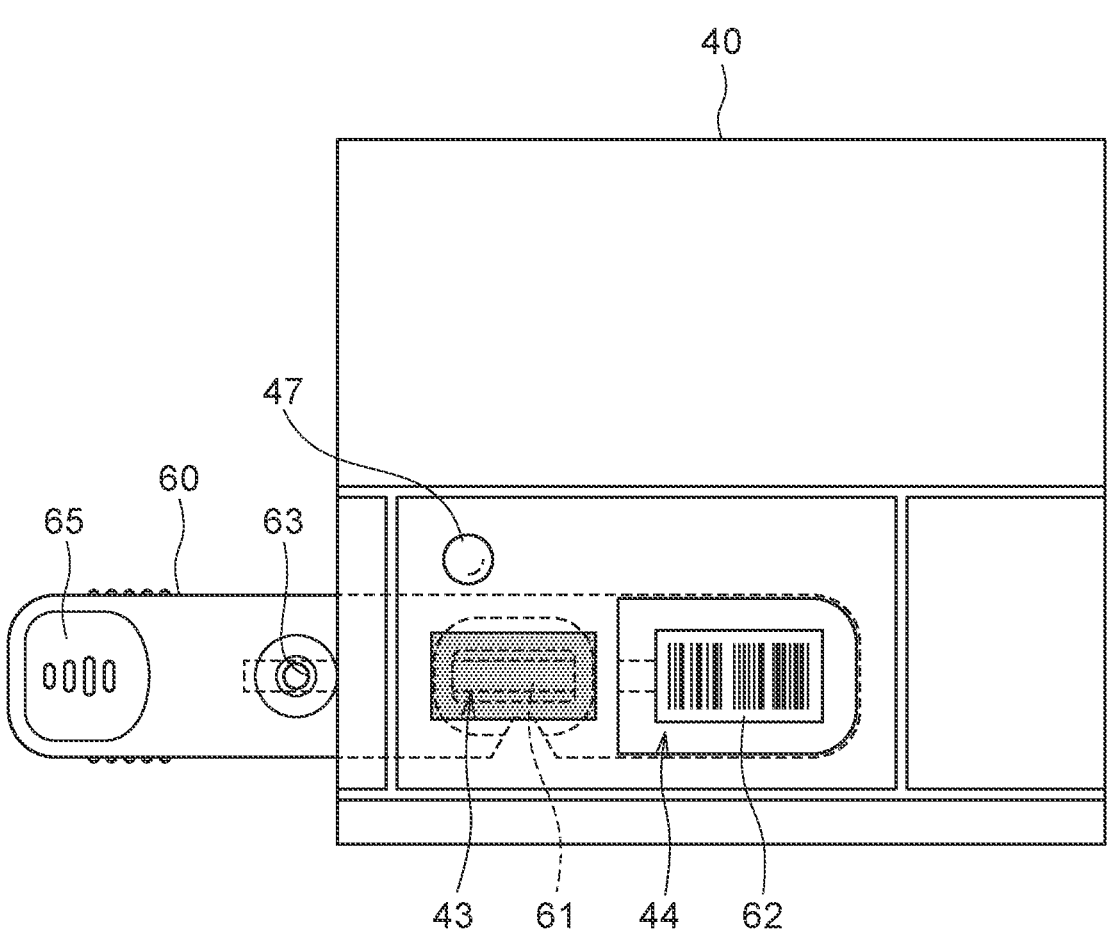
FIG. 5 illustrates the state of FIG. 4 in plan view.

FIG. 4 is an upper perspective view illustrating a state in which the test strip 60 is attached to the holding unit 40. Furthermore, FIG. 5 illustrates this state in plan view. As illustrated in FIG. 4 and FIG. 5, the test strip 60 is inserted into the holder 46 via the insertion gate 41 with the downstream side first. In this state, as illustrated in FIG. 5, the first region 61 is at the same plane position as the measurement opening 43, and the second region 62 is at the same plane position as the identification opening 44.

In this state, for example, when the liquid specimen is spotted to the sample spotting portion 63, the liquid specimen flows in the test paper 64 to the downstream side by capillary phenomenon, and a control reaction zone indicating the spotting of the liquid specimen is generated in the first region 61. Moreover, in a case in which a measurement object is contained in the liquid specimen, a target reaction zone having a strength corresponding to a concentration of the measurement object is generated. The measurement system 10 of the present embodiment measures the concentration of the measurement object by irradiating the target reaction zone with light emitted from the measurement light source 42 and measuring the intensity of the generated light. In the second region 62 described above, for example, identification information, which is information regarding the test strip 60, such as what type of the test sheet 64 is accommodated in the test strip 60, is recorded. Examples of the identification information include a barcode, a QR code (registered trademark), and the like.

(3) Mounting Part

Figure 6:
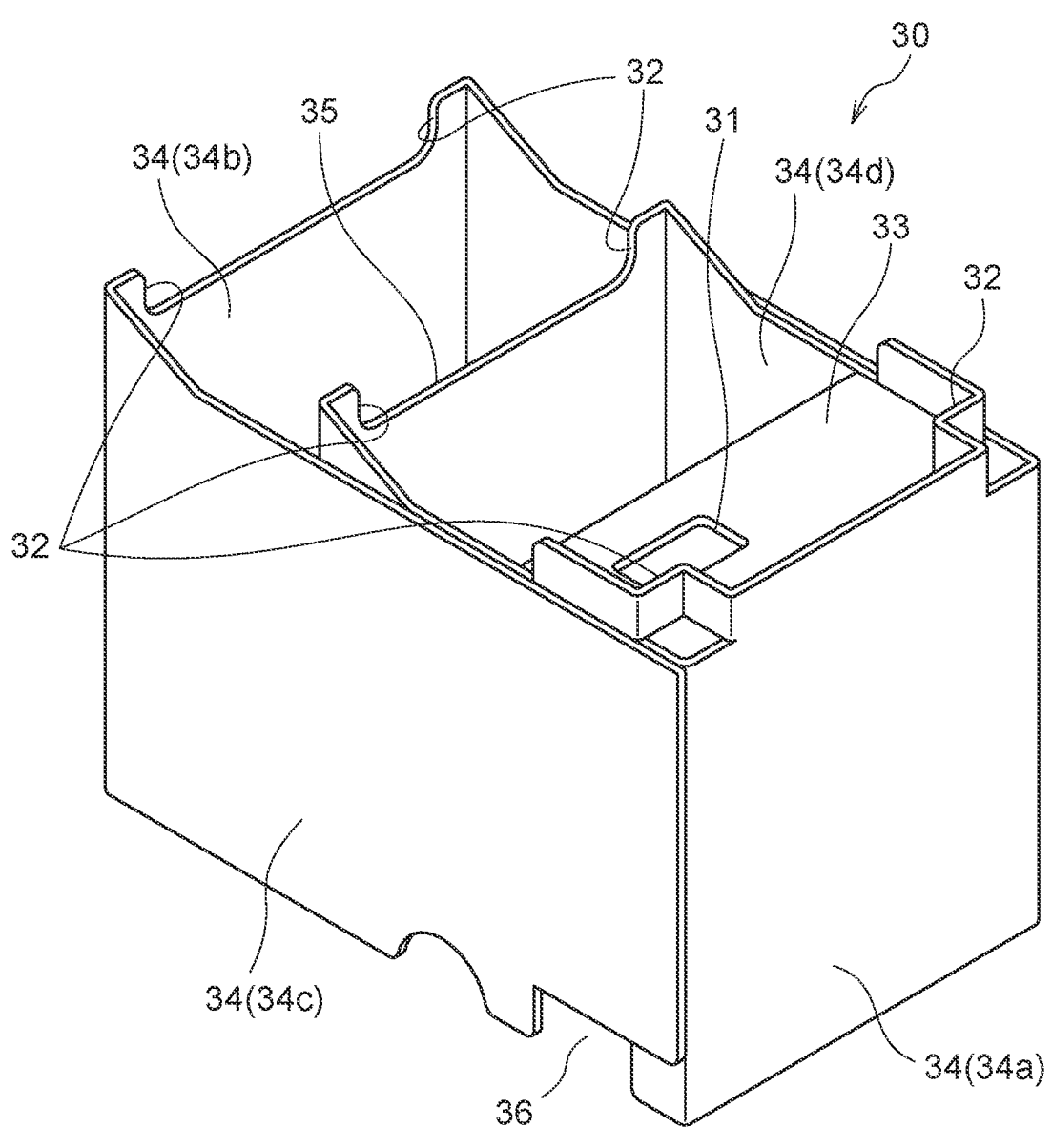
FIG. 6 is an upper perspective view illustrating a mounting part used in the embodiment.
Figure 7:
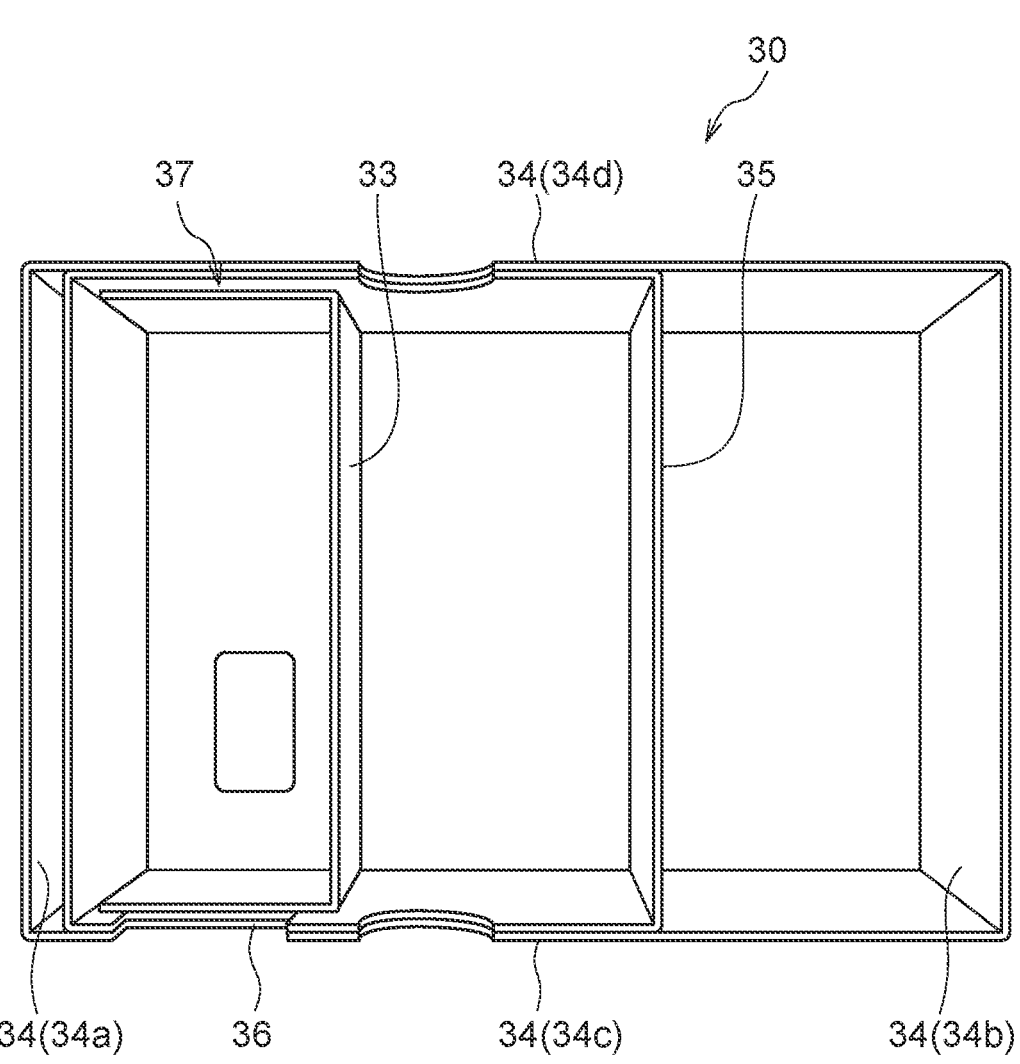
FIG. 7 illustrates the mounting part in a bottom view.

FIG. 6 is an upper perspective view illustrating a mounting part 30 used in the measurement system 10 (see FIG. 11) of the present embodiment. Furthermore, FIG. 7 illustrates the mounting part 30 in bottom view. The mounting part 30 is configured as a paper box having a substantially rectangular parallelepiped shape with an upper surface and a lower surface opened. Four side surfaces of the mounting part 30 form an outer wall portion 34 erected vertically. A placement frame 32, which is a frame on which a smart device 50 (see FIG. 10) to be described later is placed, is formed on the upper surface of the mounting part 30. On one side (Hereinafter, it is referred to as a "front side".) of the inside of the mounting part 30, a box-shaped light shielding portion 33 is formed in which the upper surface is closed while the window 31 is opened, and the lower surface is opened (see FIG. 7).

Here, among the four surfaces of the outer wall portion 34, a surface on a side where the light shielding portion 33 is located is referred to as a front surface 34*a*, a surface on an opposite side thereof is referred to as a back surface 34*b*, a surface on a left side when viewed from the front surface 34*a* is referred to as a left side surface 34*c*, and a surface on an opposite side thereof is referred to as a right side surface 34*d*. Furthermore, the inside of the mounting part 30 is partitioned by a reinforcing portion 35 parallel to the front surface 34*a* and the back surface 34*b*. Moreover, a rectangular cutout portion 36 is formed at a front side lower edge of the left side surface 34*c*.

(4) Housing

Figure 8:
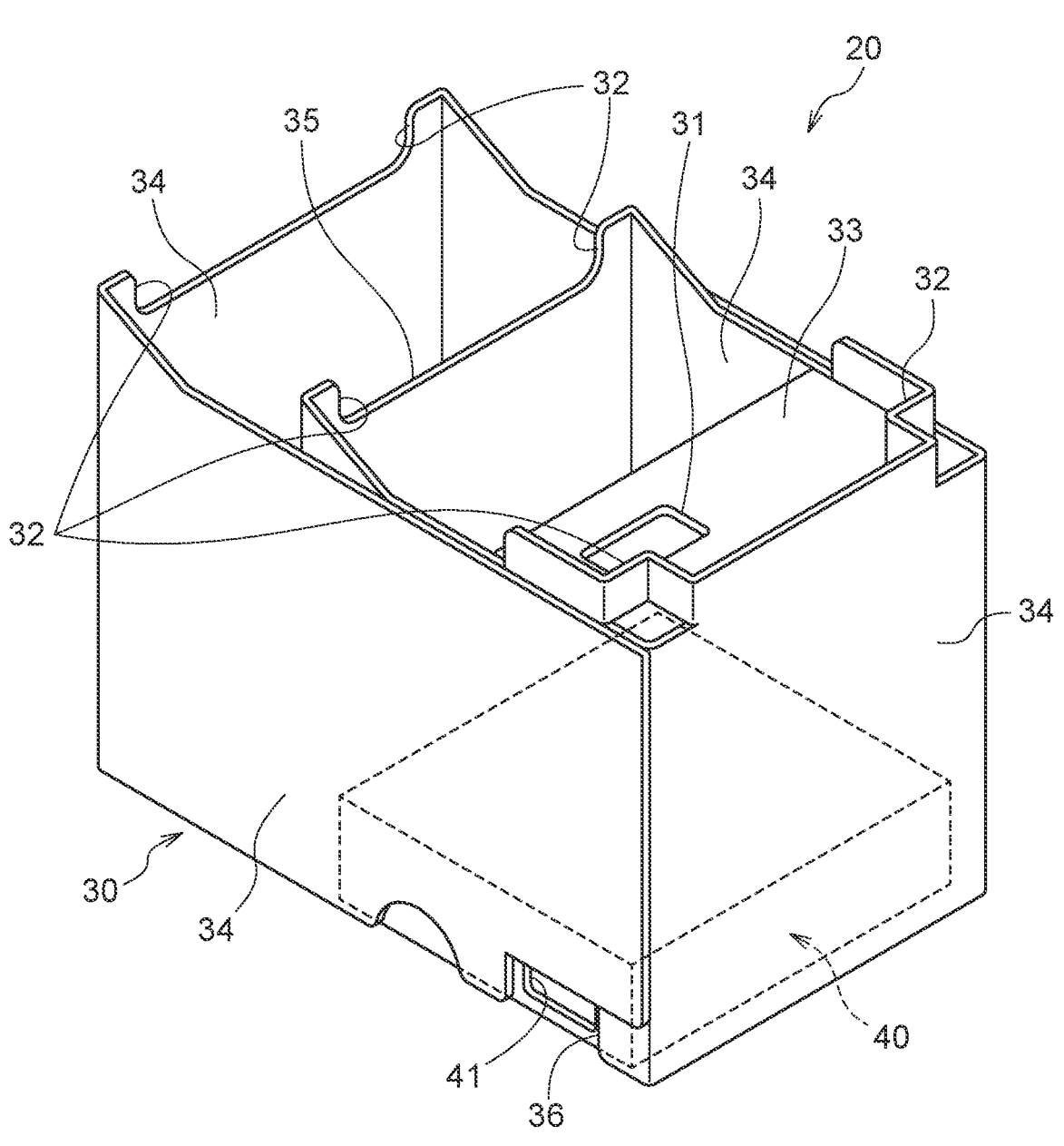
FIG. 8 is an upper perspective view of a housing according to the embodiment.

As illustrated in FIG. 7, a gap is formed between a lower edge of the light shielding portion 33 and a lower edge of the outer wall portion 34, and a space surrounded by the front surface 34*a*, the reinforcing portion 35, the left side surface 34*c*, and the right side surface 34*d* in four directions with this gap as a height is referred to as an accommodation region 37. When the holding unit 40 is attached to the accommodation region 37, the housing 20 illustrated in FIG. 8 is configured. In this state, the cutout portion 36 of the mounting part 30 and the insertion gate 41 of the holding unit 40 coincide with each other. A state in which the test strip 60 is attached to the insertion gate 41 in this state as illustrated in FIG. 4 and FIG. 5 is as illustrated in the upper perspective view illustrated in FIG. 9.

(5) Smart Device

Figure 10:
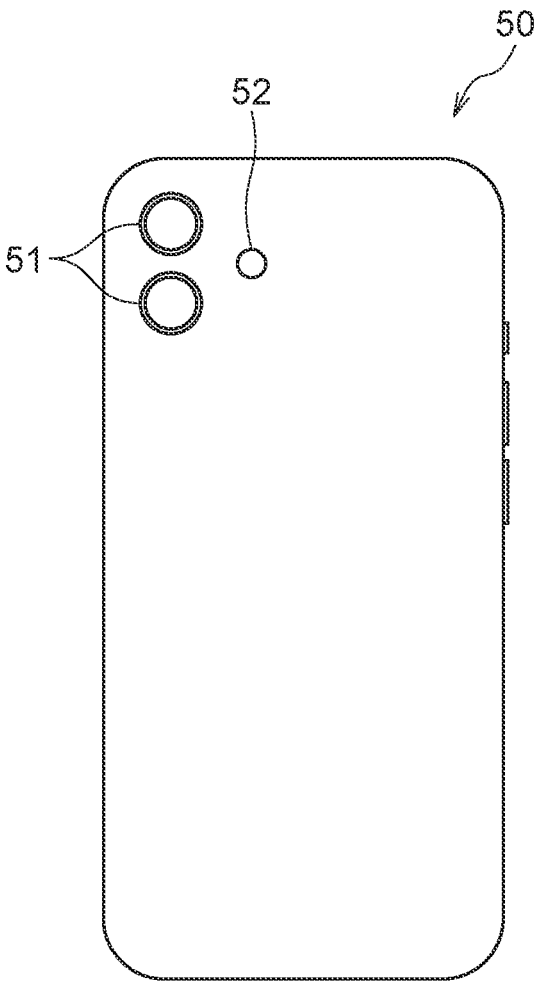
FIG. 10 illustrates a smart device used in the embodiment in bottom view.

FIG. 10 illustrates the smart device 50 used in the measurement system 10 (see FIG. 11) of the present embodiment in a state of being placed on the housing 20 in a bottom view. In the present embodiment, a smartphone is used as the smart device 50. However, a tablet terminal with a camera function may be used as the smart device 50. On the bottom surface side (so-called back surface) of the smart device 50, a camera 51 configured as a camera and an illuminator 52 configured as a flash that emits visible light beside the camera are provided. Note that a top surface side (so-called surface) of the smart device 50 is a display unit 53.

(6) Measurement System

Figure 9:
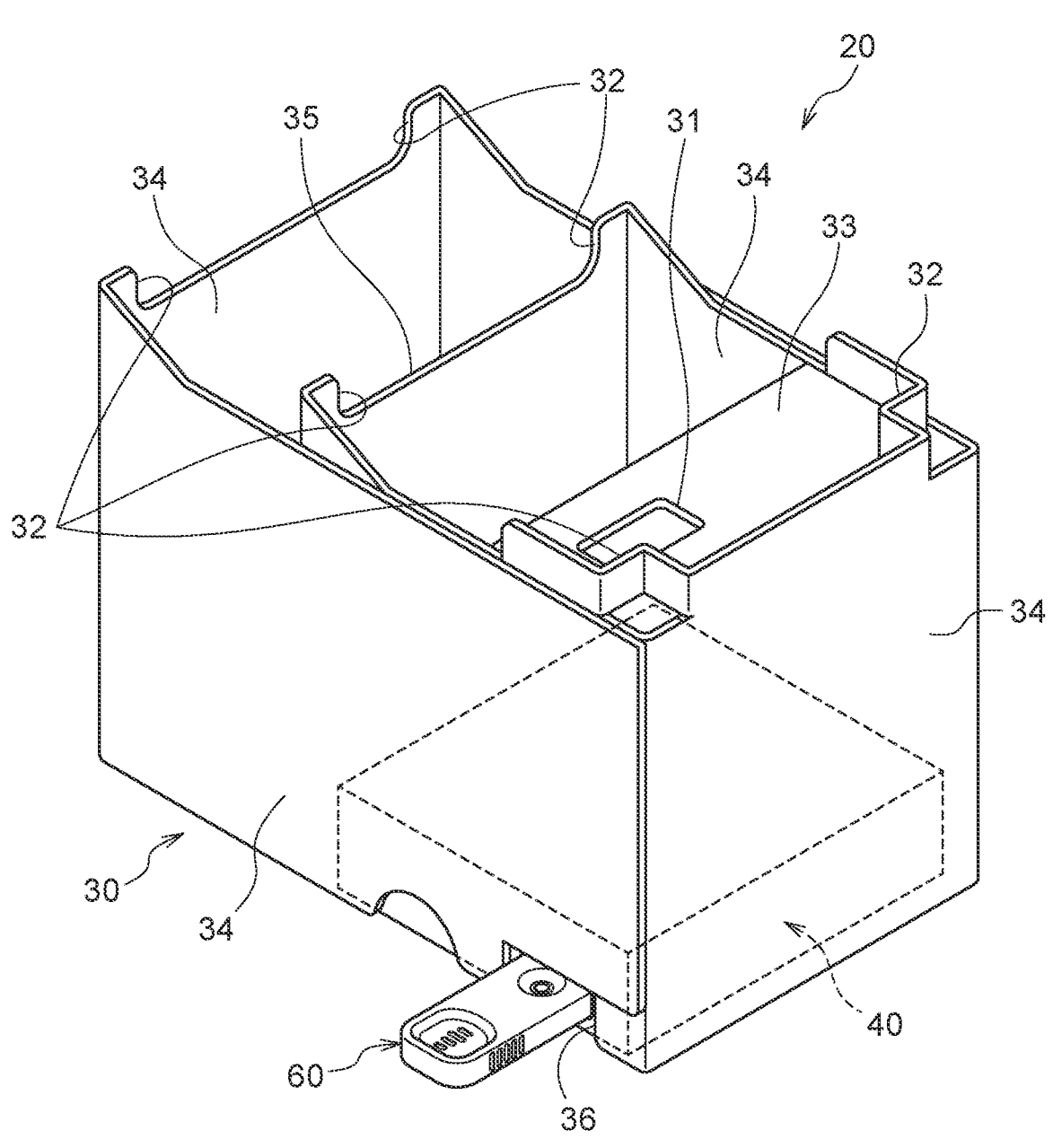
FIG. 9 is an upper perspective view illustrating a state in which a test strip is attached to the housing of FIG. 8.
Figure 11:
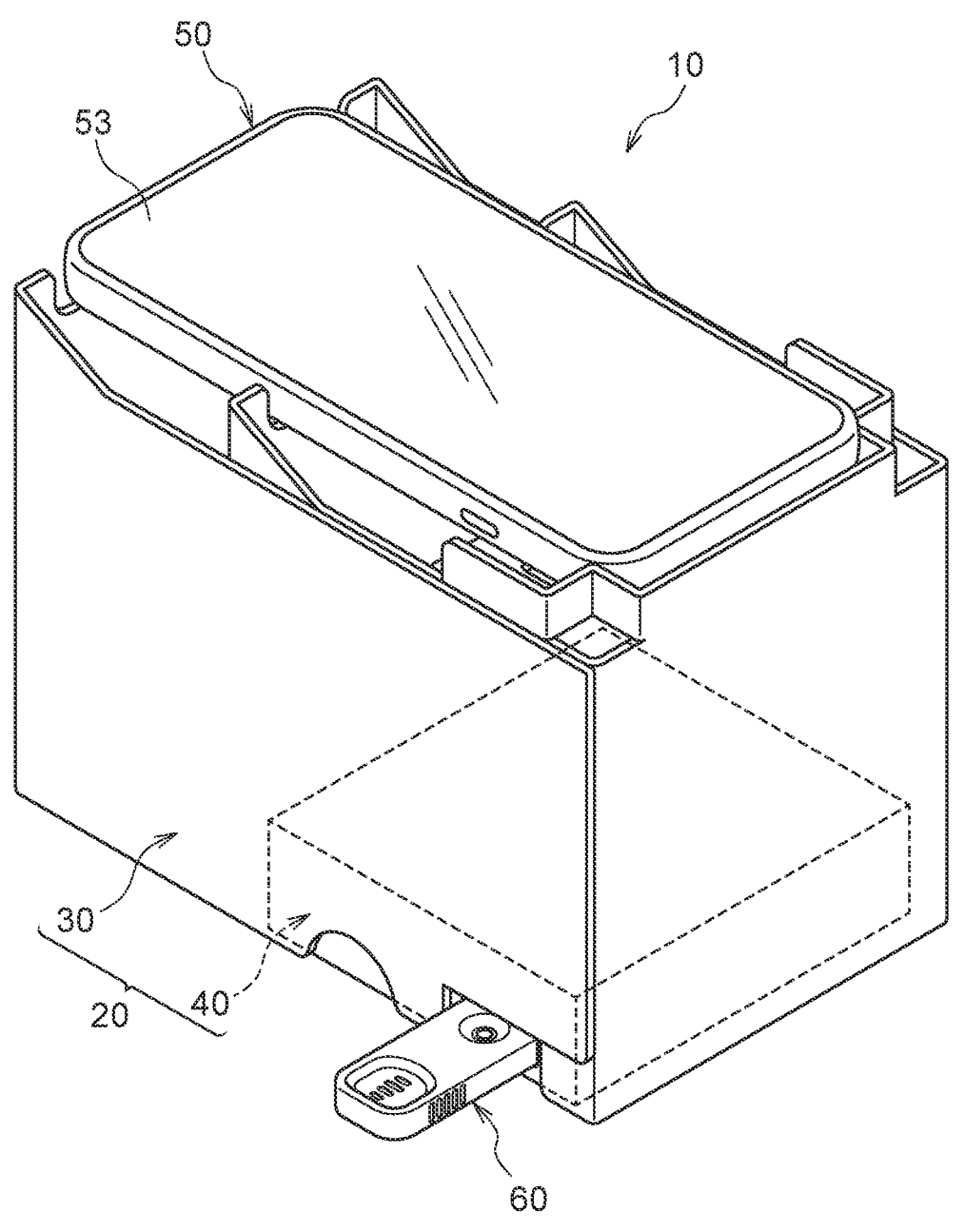
FIG. 11 is an upper perspective view of a measurement system according to the embodiment.

The smart device 50 illustrated in FIG. 10 is placed inside the placement frame 32 of the housing 20 illustrated in FIG. 9 with the camera 51 and the illuminator 52 aligned with the window 31 and the display unit 53 facing upward, whereby the measurement system 10 of the present embodiment as illustrated in the upper perspective view of FIG. 11 is configured. As illustrated in an upper perspective view of FIG. 12 illustrating a state in which the front surface 34*a*, the left side surface 34*c*, and the right side surface 34*d* of the outer wall portion 34 are removed from this state, the measurement opening 43 and the identification opening 44 of the holding unit 40 are covered with the light shielding portion 33, and entry of light from the outside world is prevented.

Figure 12:
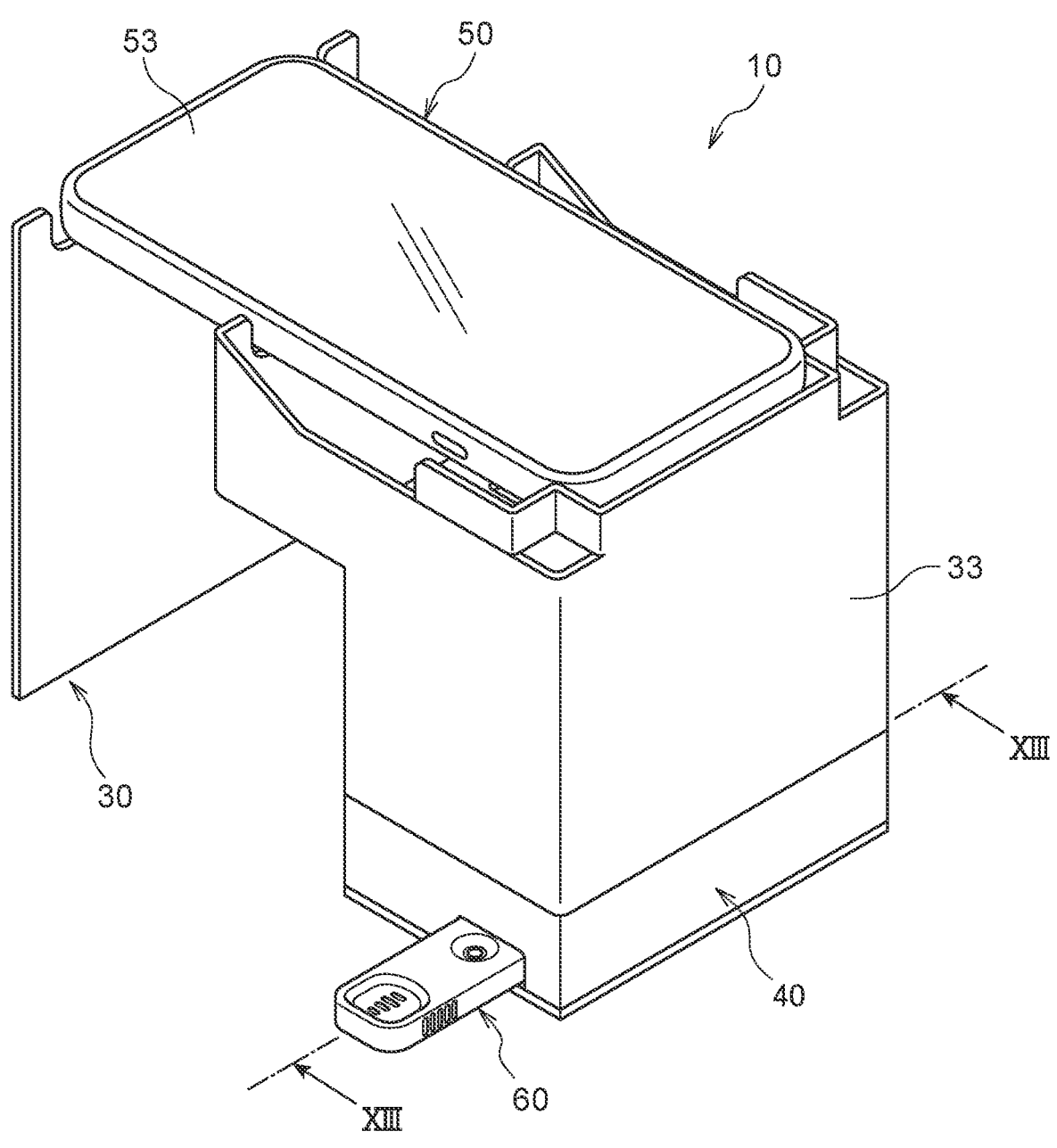
FIG. 12 is an upper perspective view illustrating a state in which a part of an outer wall portion is removed from the measurement system of FIG. 11.
Figure 13:
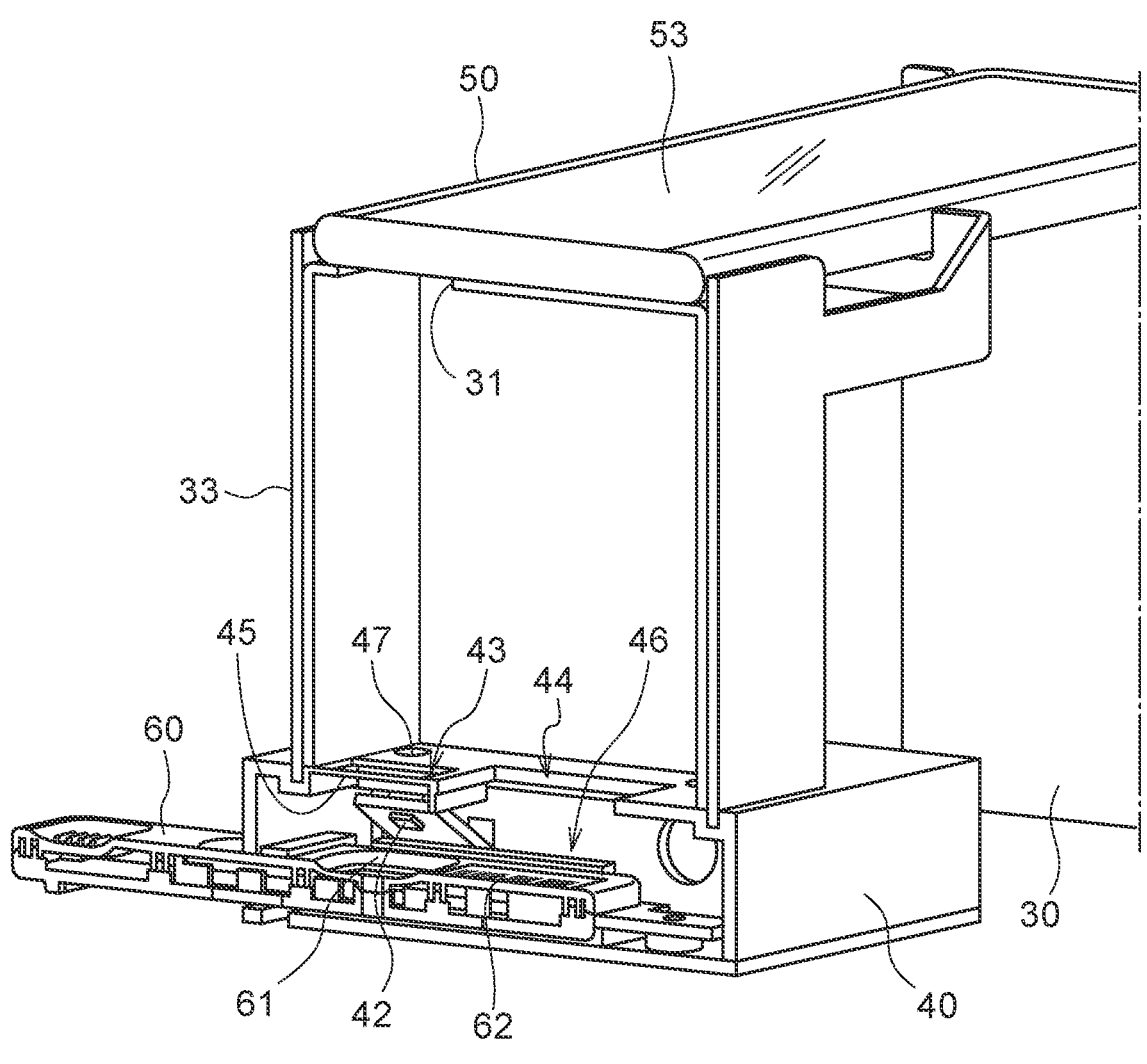
FIG. 13 illustrates a cross section taken along line XIII-XIII of FIG. 12.

Furthermore, as illustrated in FIG. 13 illustrating a cross section taken along line XIII-XIII in FIG. 12, the measurement opening 43 and the optical filter 45 are located above the first region 61 of the test strip 60, and the identification opening 44 is located above the second region 62. Moreover, the measurement light source 42 that irradiates the first region 61 from obliquely above is installed on a slightly back surface side below the identification opening 44. The window 31 of the mounting part 30 is positioned directly above the measurement opening 43, and the camera 51 of the smart device 50 covers the second region 62 in addition to the first region 61 through the window.

Figure 14:
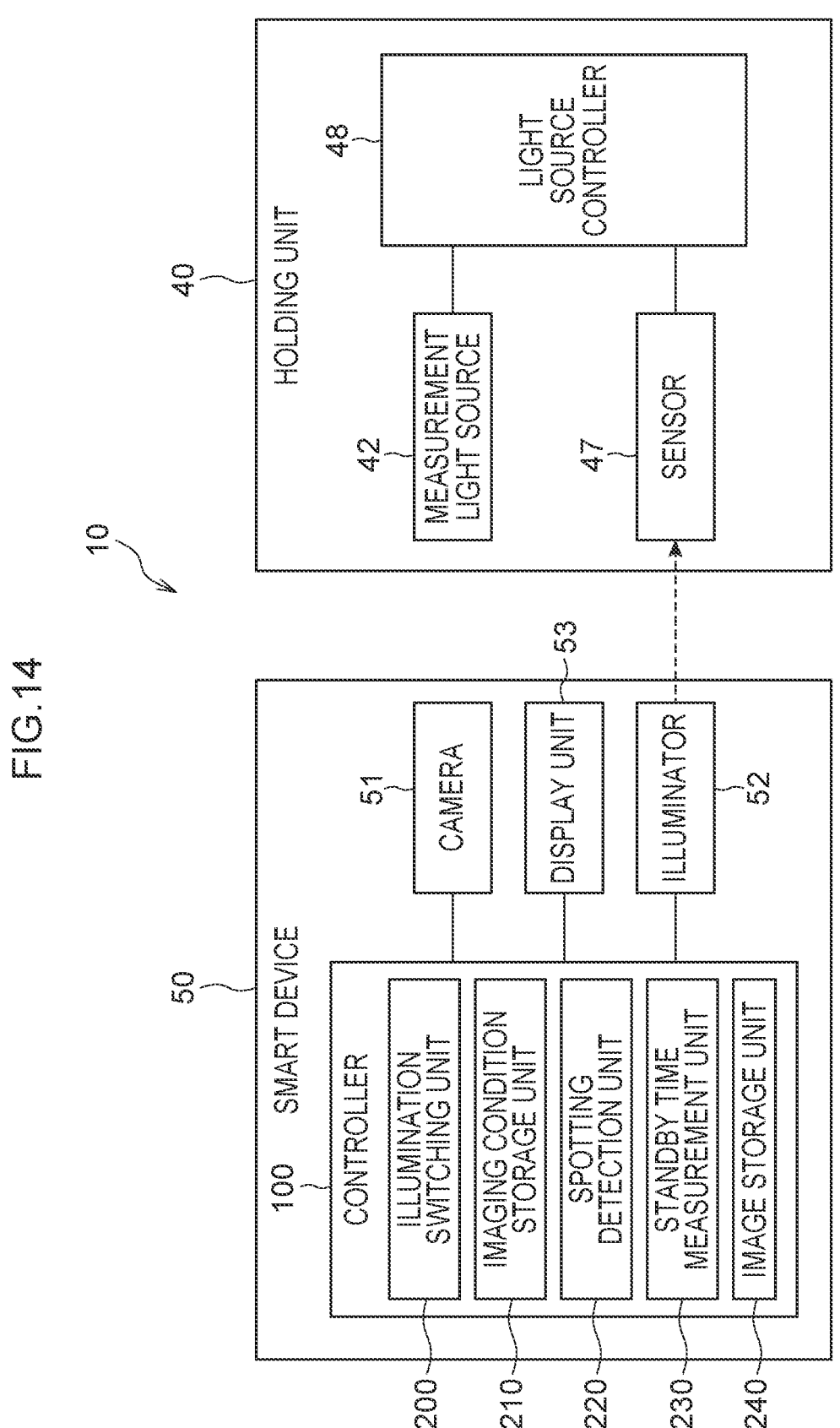
FIG. 14 is a functional block diagram of the measurement system of the embodiment.

FIG. 14 is a functional block diagram illustrating the measurement system 10 of the present embodiment. The smart device 50 is provided with the camera 51 and the illuminator 52 illustrated in FIG. 10, the display unit 53 illustrated in FIG. 11, and a controller 100 that controls these units. The controller 100 functions as the following units by using a CPU 110, a ROM 120, a RAM 130, and a storage device 150 to be described later as hardware resources of a computer.

That is, the controller 100 functions as an illumination switching unit 200 that switches on/off of illumination by the illuminator 52. Specifically, the illumination switching unit 200 can be realized as an application installed in the smart device 50, but can also be realized as a unit using electric or optical sensing with the holding unit 40 or as a wireless communication unit (for example, Bluetooth (registered trademark) or the like) with the holding unit 40. Furthermore, the controller 100 functions as an imaging condition storage unit 210 that stores imaging conditions by the camera 51. Conditions defined as the imaging conditions include, for example, a standby time required for a reaction between the measurement object and the reagent. Furthermore, the controller 100 functions as a spotting detection unit 220 that detects spotting of the sample on the test strip 60 through the camera 51. Furthermore, the controller 100 functions as a standby time measurement unit 230 that measures the standby time. Then, the controller 100 functions as an image storage unit 240 that stores the image of the first region 61 captured by the camera 51.

Figure 15:
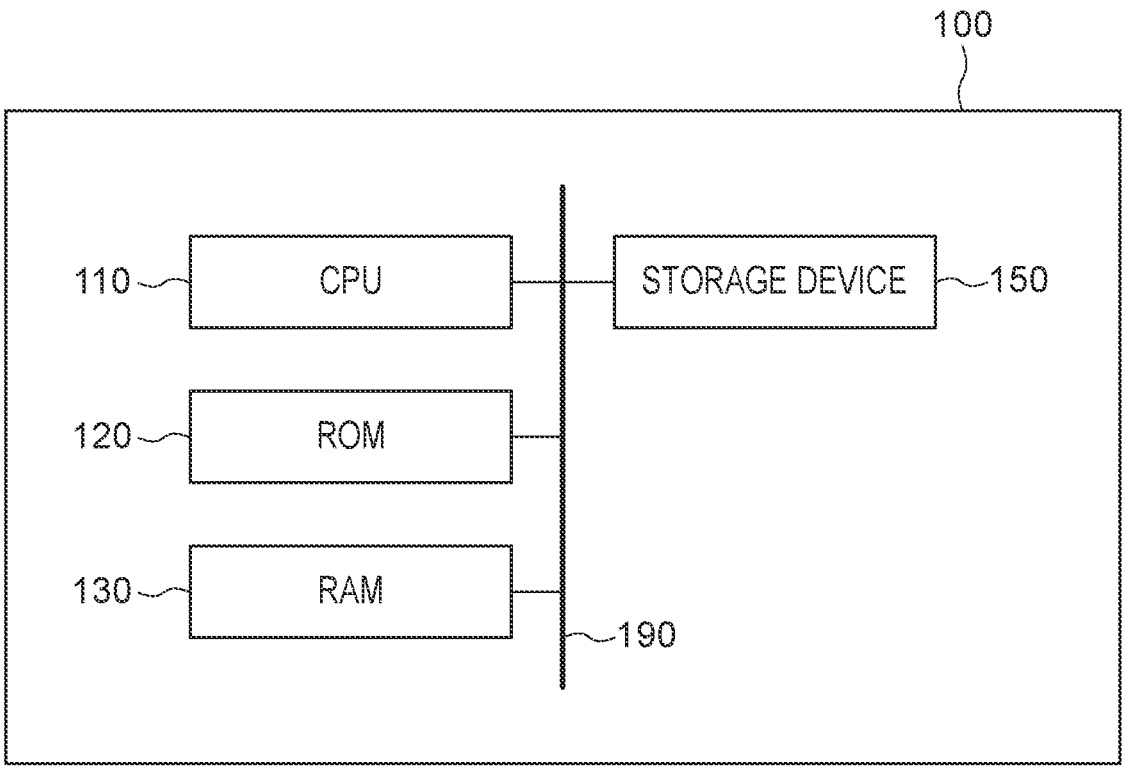
FIG. 15 is a block diagram illustrating a controller.

As illustrated in the hardware configuration of FIG. 15, the controller 100 includes the central processing unit (CPU) 110, the read only memory (ROM) 120, the random access memory (RAM) 130, and the storage device 150. The respective configurations are communicably connected to each other via a bus 190.

The CPU 110 is a central processing unit, and executes various programs and controls each unit. That is, the CPU 110 reads a program from the ROM 120 or the storage device 150, and executes the program using the RAM 130 as a work area. The CPU 110 controls the measurement system 10 according to a program recorded in the ROM 120 or the storage device 150.

The ROM 120 stores various programs and various data. The RAM 130 temporarily stores programs or data as a work area. The storage device 150 is configured as a storage by a hard disk drive (HDD), a solid state drive (SSD), or a flash memory, and stores various programs including an operating system and various data.

On the other hand, the holding unit 40 includes the measurement light source 42 that irradiates the first region 61, the sensor 47 that detects on/off of the illuminator 52, and a light source controller 48 that turns on the measurement light source 42 when a signal from the sensor 47 is input. Similarly to the controller 100 of the smart device 50, the light source controller 48 is configured as a hardware resource of a computer. Note that the light source controller 48 can realize that the measurement light source 42 is turned on regardless of an input mode of the signal from the sensor 47 (for example, in a wired or wireless manner,) as long as it can perform control to turn on the measurement light source 42 at the time of imaging the first region 61 to be described later. Furthermore, the light source controller 48 can also perform control to turn off the measurement light source 42.

As described above, the measurement system 10 of the present embodiment includes the insertion gate 41 into which the test strip 60 including the first region 61 and the second region 62 is inserted, the holder 46 that accommodates the test strip 60 inserted via the insertion gate 41, the housing 20 including the window 31 facing the test strip 60 accommodated in the holder 46, and the smart device 50 including the illuminator 52 that illuminates the second region 62 of the test strip 60 accommodated in the holder 46 and including the camera 51 that images the first region 61 and the second region 62. The housing 20 includes a mounting part 30 that places the smart device 50 on the outer surface of the housing 20 in a state in which the camera 51 and the illuminator 52 are disposed at positions facing the window 31, the holding unit 40 that holds the test strip 60 inside accommodated in the holder 46, and the measurement light source 42 provided at a position to irradiate the first region 61 inside the holding unit 40. Then, in the measurement system 10, as will be described later, the illuminator 52 is turned off while the measurement light source 42 is turned on when the camera 51 images the first region 61, and the illuminator 52 is turned on when the camera 51 images the second region 62. With such a configuration, in the measurement system 10 of the present embodiment, in a case in which there are plural imaging regions (that is, the first region 61 and the second region 62) in the test strip 60, imaging using an appropriate light source can be performed according to the imaging regions.

Here, the controller 100 functioning as the illumination switching unit 200 that switches on/off of the illumination by the illuminator 52 can perform control to turn on the illuminator 52 at the time of imaging the second region 62 and to turn off the illuminator 52 at the time of imaging the first region 61. Furthermore, the light source controller 48 can perform control to turn on the measurement light source 42 at the time of imaging the first region 61. Furthermore, from the viewpoint of preventing exhaustion of the measurement light source 42, the light source controller 48 preferably performs control to turn off the measurement light source 42 at the time of imaging the second region 62.

Here, as described above, the first region 61 is a measurement region for measuring a measurement object in the test strip 60, and the second region 62 is an identification region in which identification information of the test strip 60 is recorded. In the measurement region, the measurement object in the sample is detected by color development by a reagent that specifically reacts with the measurement object in the target reaction zone, capture of the measurement object by a reagent that specifically binds to the measurement object, or the like. Examples of the identification region include a region to which a barcode, a QR code (registered trademark), or the like is attached. Examples of the identification information recorded in the identification region include the type of the test paper 64 contained in the test strip 60, measurement conditions suitable for the test strip 60, lot information of the test strip 60, and the like. Furthermore, the measurement light source 42 is a light source suitable for detecting a measurement object in the first region 61 as a measurement region. For example, in a case in which a substance that reacts with the measurement object in the target reaction zone of the first region 61 absorbs ultraviolet light, the measurement light source 42 can perform appropriate imaging by using ultraviolet light. Note that, as a result, the measurement light source 42 having a wavelength corresponding to the measurement object can be used to image the first region 61 as the measurement region, and the illuminator 52 of the smart device 50 can be used as the light source to image the second region 62 as the identification region.

Note that the first region 61 is not limited to the measurement region, and may be an identification region as long as imaging can be appropriately performed under the lighting of the measurement light source 42, or may be a correction region for measuring a light amount of the measurement light source 42 or the illuminator 52 or the deterioration of the test paper 64 and correcting the measurement of the measurement object, or may be other regions. Furthermore, the second region 62 is not limited to the identification information, and may be a measurement area, a correction area, or other areas as long as imaging can be appropriately performed under the lighting of the illuminator 52. Since the illuminator 52 is generally a flash of the smart device 50 that emits visible light, the second region 62 is preferably a region including a measurement object that can be measured with visible light.

Note that, at the time of imaging the second region 62 as the identification region by the camera 51, it is preferable to turn off the measurement light source 42 while turning on the illuminator 52. As a result, since the measurement light source 42 can be turned on only when it is necessary to image the first region 61, the exhaustion of the measurement light source 42 can be prevented.

(7) Method of Measuring a Measurement Object by Measurement System

Figure 16:
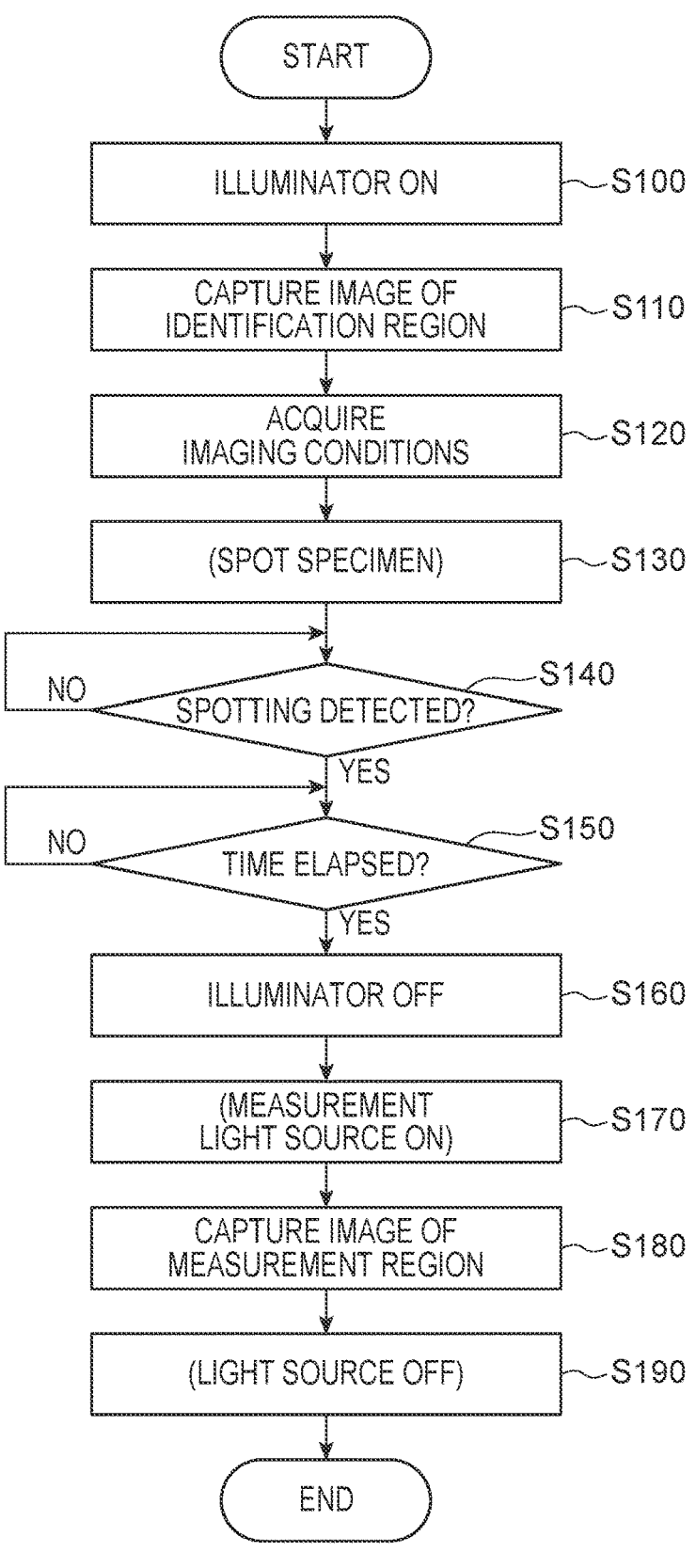
FIG. 16 is a flowchart illustrating an overview of a measurement method of a measurement object in the measurement system of the embodiment.

An example of a method of measuring a measurement object by the measurement system 10 of the present embodiment will be described with reference to a flowchart of FIG. 16. Note that, in this flowchart, an outline of a stage indicating an operation other than an operation directly performed by the smart device 50 is displayed in parentheses.

First, as illustrated in FIG. 11, the measurement system 10 on which the smart device 50 is placed is prepared in the housing 20 in which the holding unit 40 is attached to the mounting part 30, and the test strip 60 is inserted via the insertion gate 41. At this stage, when a screen of the display unit 53 (see FIG. 11 and FIG. 14) is operated, the application for measurement installed in the smart device 50 is activated, and measurement is started.

First, at a stage illustrated in S100, the illumination switching unit 200 (see FIG. 14) turns on the illuminator 52. At this stage, the measurement light source 42 of the holding unit 40 is turned off. Next, at a stage illustrated in S110, the camera 51 captures an image of the second region 62, which is the identification region, using the illuminator 52 as a light source. When the image capturing is completed, the operation proceeds to a stage illustrated in S120.

In S120, the controller 100 refers to the imaging condition storage unit 210 (see FIG. 14) from the captured image of the second region 62 to acquire the imaging conditions at the time of measurement by the test strip 60.

Meanwhile, during this period, an appropriate amount of sample is spotted to the sample spotting portion 63 (see FIG. 3) of the test strip 60 by a measurer. The spotted sample is spread to the downstream side by the test paper 64 (see FIG. 3) inside the test strip 60.

During this time, the spotting detection unit 220 (see FIG. 14) of the controller 100 continues to monitor whether or not an image (for example, the control reaction zone generated by the reaction with the measurement object) indicating that spotting is completed is detected in the first region 61 that is the measurement region through the image from the camera 51 in a stage illustrated in S140. When such an image is detected, the operation proceeds to a stage illustrated in S150.

In the stage illustrated in S150, after the detection of the completion of the spotting in the step illustrated in S140, the standby time measurement unit 230 (see FIG. 14) of the controller 100 continues to monitor whether or not the standby time required for the reaction between the measurement object and the reagent on the test paper 64 has elapsed among the imaging conditions acquired in the stage illustrated in S120.

When the standby time measurement unit 230 determines that the standby time has elapsed in the stage illustrated in S150, the illumination switching unit 200 turns off the illuminator 52 in a stage illustrated in S160.

On the other hand, at a stage illustrated in S170, in the holding unit 40, when the light source controller 48 detects that the illuminator 52 is turned off through the sensor 47 (see FIG. 1 and FIG. 14), the measurement light source 42 is turned on.

When the measurement light source 42 is turned on, the camera 51 captures an image of the target reaction zone visualized at the wavelength of the measurement light source 42 in the first region 61 in a stage illustrated in S180. When the image capturing is completed, the light source controller 48 of the holding unit 40 turns off the measurement light source 42. Note that the captured image is stored in the image storage unit 240 (see FIG. 14), and then used to calculate the content of the measurement object.

(8) Others

In the measurement system 10 of the above embodiment, the housing 20 is formed by combining the separate holding unit 40 with the mounting part 30, but the housing 20 may have a structure in which the mounting part 30 and the holding unit 40 are integrated. In this case, the housing 20 is provided with the insertion gate 41, and a space provided at the back serves as the holder 46. Then, the test strip 60 is inserted via the insertion gate 41, and the first region 61 and the second region 62 of the test strip 60 accommodated in the holder 46 are used for imaging by the camera 51 of the smart device 50 as in the above-described embodiment.

Furthermore, the test strip 60 has a structure in which the test paper 64 is accommodated inside as described in the above embodiment, but for example, the test paper 64 itself such as a urine test paper may be used as the test strip 60. In this case, not only the first region 61 but also the second region 62 is provided on the test paper 64 as the test strip 60. Furthermore, in this case, as a material of the test paper 64, as described in the above embodiment, a water absorber such as a filter paper or a synthetic resin substrate having a water absorbing layer applied on the surface thereof can be used.

INDUSTRIAL APPLICABILITY

The present invention can be used for a measurement system that spreads a measurement object in a sample with a test strip and optically detects the measurement object.

What is claimed is:

1. A measurement system comprising:
   a housing;
   a holding unit disposed within the housing, the holding unit being separate from the housing and having a box shape, and two openings, which are a measurement opening and an identification opening, being formed at an upper surface of the holding unit;
   an insertion gate into which a test strip including a first region and a second region is to be inserted into the holding unit; and
   a holder formed in the holding unit that accommodates the test strip inserted via the insertion gate, wherein:
   the housing includes a window facing the test strip accommodated in the holder,
   a smart device including an illuminator that illuminates the second region of the test strip accommodated in the holder and including a camera that images the first region and the second region,
   the housing includes a mounting part that places the smart device on an outer surface of the housing in a state in which the camera and the illuminator are disposed at positions facing the window, and a measurement light source provided at a position to irradiate the first region of the test strip accommodated in the holder, and
   in a case in which the camera images the first region, the illuminator is turned off while the measurement light source is turned on, and in a case in which the camera images the second region, the illuminator is turned on.

2. The measurement system according to claim 1, wherein, in a case in which the camera images the second region, the measurement light source is turned off while the illuminator is turned on.

3. The measurement system according to claim 2, wherein:
   the smart device includes a controller that turns on the illuminator at a time of imaging the second region and turns off the illuminator at a time of imaging the first region, and
   the housing includes a light source controller that turns on the measurement light source at the time of imaging the first region and turns off the measurement light source at the time of imaging the second region.

4. The measurement system according to claim 3, wherein the first region is a measurement region in which a measurement object contained in a sample spotted on the test strip is measured, and the second region is an identification region in which identification information related to the test strip is recorded.

5. The measurement system according to claim 4, wherein the measurement light source is a measurement light source suitable for detecting the measurement object in the measurement region.

6. A measurement method using the measurement system according to claim 3, the measurement method comprising:
   the controller turning on the illuminator;
   the camera imaging the second region of the test strip inserted into the housing;
   the controller turning off the illuminator;
   the light source controller turning on the measurement light source;
   the camera imaging the first region illuminated by the measurement light source; and
   the light source controller turning off the measurement light source.

\* \* \* \* \*